No. 756,701. PATENTED APR. 5, 1904.
C. L. POPE.
FASTENER FOR CLIP BANDS.
APPLICATION FILED DEC. 30, 1903.
NO MODEL.
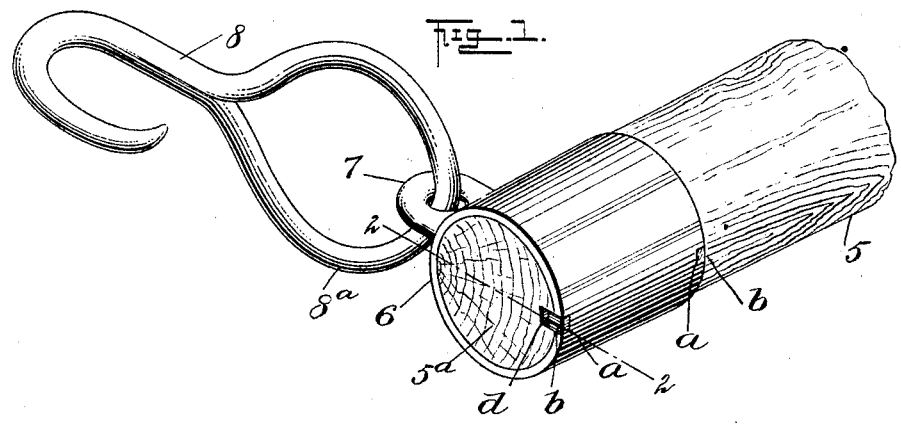
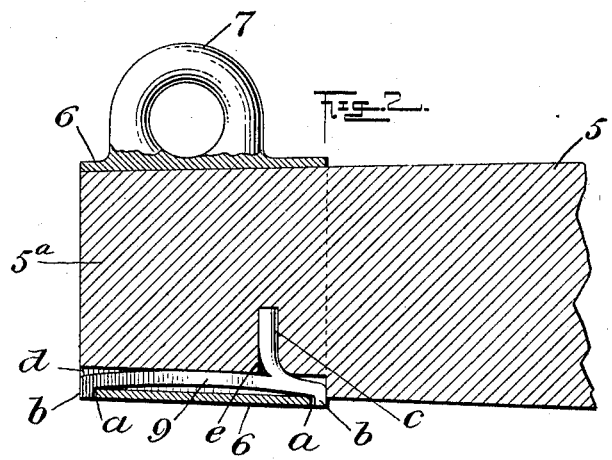
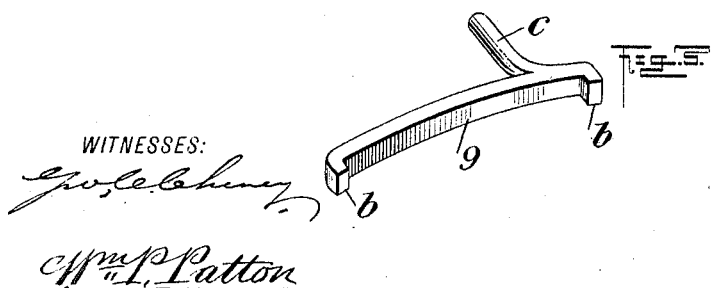
WITNESSES:
INVENTOR
Charles L. Pope
BY
ATTORNEYS No. 756,701.                                     Patented April 5, 1904.

UNITED STATES PATENT OFFICE.

CHARLES L. POPE, OF ELY, NEVADA.

FASTENER FOR CLIP-BANDS.

SPECIFICATION forming part of Letters Patent No. 756,701, dated April 5, 1904.

Application filed December 30, 1903. Serial No. 187,187. (No model.)

*To all whom it may concern:*

Be it known that I, CHARLES L. POPE, a citizen of Canada, and a resident of Ely, in the county of White Pine and State of Nevada, have invented a new and Improved Fastener for Clip-Bands, of which the following is a full, clear, and exact description.

This invention relates to means for immovably securing the clip-bands which are parts of trace-hook mountings on the ends of whiffletrees and also for securing the ring-eyes on neck-yokes and other parts of a wagon running-gear or the like, and has for its object to provide novel features of construction for a clip-band fastener which are simple, practical, and inexpensive and that may be readily applied for the secure attachment of clip bands or rings upon wagon running-gear or the like, so as to hold in place trace-hooks or ring-eyes on the ends and centers of neck-yoke bars, whiffletrees, or on the ends of wagon-poles, as may be desired.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view showing the application of the invention to hold a trace-hook and an integral clip-ring affixed upon a whiffletree. Fig. 2 is an enlarged transverse sectional view substantially on the line 2 2 in Fig. 1, showing the clip-band, the ring-eye thereon, and the novel means for locking the clip-band upon a whiffletree; and Fig. 3 is a perspective view of the improved clip-band fastener.

For effective service it is essential that the rings or bands employed as ferrules mounted on the ends of whiffletrees or on neck-yoke bars at their ends and centers should be held from turning around or from slipping endwise, the latter being generally the result when the wood of which the whiffletree or neck-yoke is made shrinks.

The improved means provided by this invention is adapted to compensate for the shrinkage of material in whiffletrees, neck-yoke bars, or the ends of wagon-poles whereon clip-bands are usually mounted and to hold the bands in place and is constructed, essentially, as follows:

In the drawings that illustrate the construction and application of the improvement, 5 indicates an end portion of a whiffletree formed cylindrically of wood, as usual, and slightly tapered toward its extremity. A clip-band 6, that embodies a feature of the invention, is fitted to drive upon the end $5^a$ of the whiffletree 5 and to this end is given a slightly-tapering but substantially cylindrical form.

Upon the exterior of the clip-band 6 an eye 7 is integrally formed or secured, and in said ring-eye the trace-hook 8 is engaged by the looped rear end $8^a$ thereof, this being an ordinary provision for the detachable connection of a harness-trace (not shown) with the whiffletree 5 on a wagon. At a suitable point, which may be opposite the ring-eye 7, a rectangular notch $a$ is formed in each of the edges of the clip-band in a plane parallel with the longitudinal axis of the whiffletree.

As clearly shown in Figs. 2 and 3, the improved clip-band fastener is in the form of a preferably rectangular key-bar 9 of resilient metal. At each end of the key-bar 9 a locking-toe $b$ is formed, and near one of said toes a dowel-pin $c$ is integrally projected from the side of the key-bar opposite the side from which the toes $b$ project.

Before the clip-band 6 is mounted upon the end $5^a$ of the whiffletree 5 a channel or keyway $d$ is formed longitudinally in the end portion of the whiffletree of such dimensions as will adapt said keyway to receive the body of the key-bar 9. A dowel-receiving perforation or socket-hole $e$ is formed in the bottom of the channel or keyway $d$ at a proper point. The key-bar 9 is slightly arched, so as to render the side having the dowel thereon convex and the opposite side having the toes $b$ concave.

In application of the improvement for securing the clip-band 6 upon the end portion of a whiffletree 5 the dowel-pin $c$ is bedded in the socket $e$, so as to seat the key-bar 9 in the keyway $d$.

The inner end of the clip-band 6 is forced upon the free end portion 5ᵃ of the whiffletree-body 5, which will rock the corresponding end of the key-bar down in the keyway $d$ and flatten the arched body of the key-bar. The clip-band is now driven completely upon the end portion of the whiffletree and in such a relative position that the toes $b$ will be pressed into the notches $a$ when the clip-band is properly mounted upon the whiffletree.

It will be seen that as the dowel-pin is bedded in the socket-hole $e$ and the toes $b$ are engaged within the notches $a$ in the ends of the clip-band 5 the latter will be affixed upon the whiffletree for the protection of its end and be held from turning around, having its ring-eye 7 properly disposed to permit the hook 8 to have proper engagement with the end of a harness-trace. (Not shown.)

Obviously the improvements may be applied for securing a clip-band upon the ends and center of a neck-yoke or spreader-bar or the end of a wagon-pole and prevent accidental displacement of these attachments or mountings on the running-gear of a vehicle.

Having thus described my invention, I claim as new and desire to secure by Letters Patent—

1. The combination with a whiffletree or the like, having a longitudinal keyway therein, of a clip-band having a notch therein, and a bent key-bar adapted to seat in the keyway and engage a toe formed on one end thereof, with the notch, when the clip-band is mounted upon the whiffletree.

2. The combination with a whiffletree or the like, having a longitudinal keyway therein and also a socket-hole formed in the bottom of the keyway, of a clip-band having a notch therein, that may register with the keyway when the clip-band is mounted on the whiffletree, and a bent resilient key-bar, having a dowel-pin thereon that engages the socket-hole when the key-bar is seated in the keyway, and a toe formed on the end of the key-bar, which will enter the notch in the end of the clip-band when said clip-band is driven upon the whiffletree.

3. The combination with a whiffletree or the like, having a longitudinal keyway formed therein, and also a socket-hole formed in the bottom of the keyway, of a clip-band having an eye projected at the side and a notch formed in the edge at each end, said notches registering with the keyway when the band is mounted upon the whiffletree, and a key-bar formed of resilient metal, and bent into arch form so as to render it convex on one side and concave on the opposite side, a dowel-pin formed on the convex side of the key-bar, adapted to be bedded in the socket-hole when the key-bar is seated in the keyway, and a toe formed on each end of the key-bar and projecting toward the concave side thereof, said toes entering and filling the notches in the ends of the clip-band when said band is forced completely upon the whiffletree.

4. A clip-band fastening of the character described, consisting of a rectangular-bodied key-bar, slightly arched to render it convex on one side, and concave on the opposite side, said key-bar having an integral dowel-pin projected from its convex side between the ends thereof, and a toe bent toward the concave side at each end of the key-bar.

In testimony whereof I have signed my name to this specification in the presence of two subscribing witnesses.

CHARLES L. POPE.

Witnesses:
WILLIAM C. ROSE,
JAMES OSTERGARD.